US009055231B2

(12) United States Patent
Garten

(10) Patent No.: US 9,055,231 B2
(45) Date of Patent: *Jun. 9, 2015

(54) MULTIPLE EXPOSURE HIGH DYNAMIC RANGE IMAGE CAPTURE

(75) Inventor: Haim Garten, Haifa (IL)

(73) Assignee: QUALCOMM Technologies, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/569,118

(22) Filed: Aug. 7, 2012

(65) Prior Publication Data

US 2012/0293685 A1 Nov. 22, 2012

Related U.S. Application Data

(63) Continuation of application No. 12/763,693, filed on Apr. 20, 2010, now Pat. No. 8,237,813.

(60) Provisional application No. 61/171,936, filed on Apr. 23, 2009.

(51) Int. Cl.
*H04N 5/235* (2006.01)
*H04N 5/238* (2006.01)
(Continued)

(52) U.S. Cl.
CPC ............ *H04N 5/2355* (2013.01); *G06F 3/1454* (2013.01); *G09G 5/06* (2013.01); *G09G 5/14* (2013.01); *G09G 2320/02* (2013.01);
(Continued)

(58) Field of Classification Search
USPC ............ 348/222.1, 239, 229.1; 382/254, 274, 382/284, 294
See application file for complete search history.

(56) References Cited

U.S. PATENT DOCUMENTS 5,194,960 A 3/1993 Ota
5,801,773 A 9/1998 Ikeda
(Continued)

FOREIGN PATENT DOCUMENTS

WO 2010/123923 A1 10/2010

OTHER PUBLICATIONS

Rovid, A.; Varkonyi-Koczy, A.R.; Hashimoto, T.; Balogh, S.; Shimodaira, Y., "Gradient Based Synthesized Multiple Exposure Time HDR Image," Instrumentation and Measurement Technology Conference Proceedings, 2007. IMTC 2007. IEEE , vol., No., pp. 1,6, May 1-3, 2007 doi: 10.1109/1MTC.2007.379132.*
(Continued)

*Primary Examiner* — Sinh Tran
*Assistant Examiner* — Shahbaz Nazrul
(74) *Attorney, Agent, or Firm* — Knobbe, Martens, Olson & Bear, LLP

(57) ABSTRACT

Techniques for creating a High Dynamic Range (HDR) image within a consumer grade digital camera from a series of images of a scene captured at different exposure levels, and displaying the HDR image on the camera's built-in display, are provided. The approach employs mixing images of the series to incorporate both scene shadow and highlight details, and the removing of "ghost" image artifacts appearing in the mixed HDR image resulting from movement in the scene over the time the series images are captured. The low computational resource utilization of the present invention's image mixing and ghost removal processing operations, along with the present invention's ability to commence image mixing and ghost removal prior to the acquisition of all series images, can significantly reduce the time required to generate and display a tone mapped HDR image.

18 Claims, 7 Drawing Sheets

(51) Int. Cl.
*G06K 9/40* (2006.01)
*G09G 5/06* (2006.01)
*G09G 5/14* (2006.01)
*H04N 5/232* (2006.01)
*G06F 3/14* (2006.01)

(52) U.S. Cl.
CPC ............... *G09G2320/0285* (2013.01); *G09G 2340/0414* (2013.01); *G09G 2340/0421* (2013.01); *G09G 2340/06* (2013.01); *G09G 2340/10* (2013.01); *H04N 5/232* (2013.01); *H04N 5/23248* (2013.01)

(56) References Cited

U.S. PATENT DOCUMENTS

| | | | |
|---|---|---|---|
| 5,828,793 | A | 10/1998 | Mann |
| 6,148,060 | A | 11/2000 | Collins et al. |
| 6,177,958 | B1 | 1/2001 | Anderson |
| 6,204,881 | B1 | 3/2001 | Ikeda et al. |
| 6,720,993 | B1 | 4/2004 | Hwang et al. |
| 7,110,025 | B1 | 9/2006 | Loui et al. |
| 7,197,192 | B2 | 3/2007 | Edwards |
| 7,239,805 | B2 | 7/2007 | Uyttendaele et al. |
| 7,317,844 | B1 | 1/2008 | Horne |
| 7,373,017 | B2 | 5/2008 | Edwards et al. |
| 7,403,707 | B2 | 7/2008 | Raskar et al. |
| 7,746,375 | B2 | 6/2010 | Ketelaars et al. |
| 7,948,538 | B2 | 5/2011 | Asoma |
| 8,106,967 | B2 | 1/2012 | Tsuchiya |
| 8,228,392 | B2 | 7/2012 | Siddiqui et al. |
| 2003/0117412 | A1 | 6/2003 | Brooksby et al. |
| 2004/0095472 | A1 | 5/2004 | Yoshida et al. |
| 2005/0013501 | A1 | 1/2005 | Kang et al. |
| 2005/0030315 | A1 | 2/2005 | Cohen et al. |
| 2006/0133688 | A1 | 6/2006 | Kang et al. |
| 2007/0242900 | A1 | 10/2007 | Chen et al. |
| 2008/0043114 | A1 | 2/2008 | Sung et al. |
| 2008/0094486 | A1 | 4/2008 | Fuh et al. |
| 2008/0284872 | A1 | 11/2008 | Asoma |
| 2009/0046947 | A1 | 2/2009 | Kobayashi |
| 2009/0060315 | A1 | 3/2009 | Harris et al. |
| 2010/0033553 | A1 | 2/2010 | Levy |
| 2010/0054628 | A1 | 3/2010 | Levy et al. |
| 2010/0157078 | A1 | 6/2010 | Atanassov et al. |
| 2010/0185562 | A1 | 7/2010 | Nafeh |
| 2010/0232726 | A1 | 9/2010 | Liu |
| 2010/0259636 | A1 | 10/2010 | Tzur |
| 2010/0271512 | A1 | 10/2010 | Garten |
| 2011/0211732 | A1 | 9/2011 | Rapaport |
| 2011/0254976 | A1 | 10/2011 | Garten |
| 2012/0218442 | A1 | 8/2012 | Jandhyala et al. |
| 2012/0288217 | A1 | 11/2012 | Zhai et al. |

OTHER PUBLICATIONS

Mertens, Tom; Kautz, J.; Van Reeth, F., "Exposure Fusion," Computer Graphics and Applications, 2007. PG '07. 15th Pacific Conference on , vol., No., pp. 382,390, Oct. 29, 2007-Nov. 2, 2007 doi: 10.1109/PG.2007.17.*

Official Communication for U.S. Appl. No. 13/090,985 mailed Mar. 29, 2013.
Official Communication for U.S. Appl. No. 13/091,068 mailed Jun. 24, 2013.
Official Communication for U.S. Appl. No. 12/756,035 mailed Jul. 16, 2013.
Search Report issued by the United Kingdom Intellectual Property Office on Aug. 15, 2012 in related UK Patent Application No. GB 12068334.
Official Communication for U.S. Appl. No. 13/090,985 mailed Sep. 11, 2012.
Extended Search Report issued by the European Patent Office for EP Appln. No. 12164871.1 dated Sep. 17, 2012.
Zhengguo, Li et al., "Movement Detection for the Synthesis of High Dynamic Range Images," 2010 17th IEEE International Conference on Image Processing, pp. 3133-3136, Sep. 26, 2010.
Grosch, Thorsten et al., "Fast and Robust High Dynamic Range Image Generation with Camera and Object Movement," Vision, Modeling and Visualization 2006, Aachen, Germany, IOS Press Nov. 22, 2006.
Gallo, Orazio et al., "Artifact-Free High Dynamic Range Imaging," IEEE International Conference on Computational Photography, Apr. 16, 2009.
International Search Report and Written Opinion for International Patent Application No. PCT/US2010/030301 dated Jul. 2, 2010.
Official Communication for U.S. Appl. No. 12/756,035 mailed Mar. 6, 2012.
International Search Report and Written Opinion for International Application No. PCT/US2010/031780 dated Jun. 11, 2010.
Reinhard, E. et al., "High Dynamic Range Imaging Acquistion, Display, and Image-Based Lighting," The Morgan Kaufmann Series in Computer Graphics and Geometric Modeling, 2005, Chapter 4, pp. 115-165.
Kang, S. B. et al., "High Dynamic Range Video," Interactive Visual Media Group, Microsoft Research, Jul. 2003, pp. 1-7.
"Enfuse—PanoTools.org Wiki," last modified Jan. 30, 2010, pp. 1-8 http://wiki.panotools.org/Enfuse.
Sunday, D., "Bounding Containers for Polygons, Polyhedra, and Point Sets (2D & 3D)," Algorithm 8, Jun. 28, 2011, 12 pages http://softsurfer.com/Archive/algorithm_0107_algorithm_0107.html.
Official Communication for U.S. Appl. No. 12/763,693 mailed Mar. 29, 2012.
Search Report in GB Patent Application No. 1206833.4 dated Dec. 18, 2012.
Official Communication for U.S. Appl. No. 12/756,035 mailed Jul. 23, 2012.
Official Communication for U.S. Appl. No. 12/756,035 mailed Oct. 1, 2012.
Official Communication for U.S. Appl. No. 12/756,035 mailed Feb. 8, 2013.
Official Communication for U.S. Appl. No. 13/090,985 mailed Jan. 3, 2013.
Official Communication for U.S. Appl. No. 13/091,068 mailed Jan. 3, 2013.
Official Communication for U.S. Appl. No. 13/091,068 mailed Mar. 12, 2013.
"Enfuse", last modified Oct. 18, 2010, www.wiki-panotools.org/Enfuse; 8 pages.

* cited by examiner

MULTIPLE EXPOSURE HIGH DYNAMIC RANGE IMAGE CAPTURE

CROSS-REFERENCE TO RELATED APPLICATIONS

The present application is a Continuation of U.S. patent Application Ser. No. 12/763,693, entitled "MULTIPLE EXPOSURE HIGH DYNAMIC RANGE IMAGE CAPTURE", FILED Apr. 20, 2010; which application claims priority under 35 U.S.C. §119(e) to U.S. Provisional Application Ser. No. 61/171,936, entitled "HDR from Multiple Exposures" filed on Apr. 23, 2009; all of the foregoing applications are incorporated herein by reference in their entireties.

BACKGROUND OF INVENTION

1. Field of Invention

This invention relates to the acquisition and processing of images that display the full range of gray shades that appear in a physical scene, often referred to as a "High Dynamic Range" or "HDR" image. More particularly it relates to a system and method for the image capture and processing of a HDR image in a digital image capture device such as a consumer grade digital camera.

2. Discussion of Related Art

Images captured by digital cameras are most commonly Low Dynamic Range (LDR) images, in which each image pixel is comprised of a limited number of digital bits per color. The number of digital bits per pixel is called the digital pixel bit width value. This number is commonly 8 bits. Such 8 bit pixels can be used to form an image with 256 different gray levels for each color at each pixel location. In a LDR image of a scene, shadow areas of the scene are depicted as being completely black (black saturation), bright sunlit areas of the scene are depicted as being completely white (white saturation), and scene areas in between are shown in a range of gray shades. A High Dynamic Range (HDR) image is one that has digital pixel bit width values of greater than 8 bits, 16 bits per pixels is a possible value. In such an image the full range of gray shades that appear in a physical scene can be displayed. These gray shades provide image details that are present in the scene's shadow regions, highlight regions and mid tone regions that are missing from the LDR image. Thus, in an HDR image, scene details are present in image dark areas that are in shadow due to their proximity next to tail buildings and beneath trees, in light areas directly illuminated by bright sunlight, as well as in mid-illumination areas that are lighted between these 2 extremes.

An HDR image can be captured by acquiring multiple LDR images of a scene that are captured at different exposure levels. These multiple LDR images are called a bracketed exposed image series. A low exposure level will properly capture the gray shades in scene areas fully illuminated by bright sunlight and a high exposure level will property capture the gray shades in scene areas completely shielded from the sun and sky by buildings and trees. However, at the low exposure level the areas of the scene in shadow will be completely black, in black saturation, and show no detail, and the mid-tone areas will lose detail. Further, at the high exposure level, the highlights of the scene will be completely white, in white saturation, and show no detail, and the mid-tone areas will again lose detail. Thus, a third, mid exposure level Image, which properly captures mid level gray shades, is often acquired as well. By mixing these three LDR images, an HDR image can be generated that depicts the full gray scale range of the scene.

Deriving a HDR image from a bracketed exposed image series currently requires a complex implementation that employs an expensive computational engine. This is due to the need to perform 3 separate processing operations to properly mix the bracketed exposed image series into a single HDR image, and a fourth to convert the resulting image, which is now composed of pixels with digital pixel bit width values of greater than 8 bits per color, into one that can be displayed on commonly available 8 bit per pixel per color displays. These four processing operations are:

"Imago Registration" for accurately aligning the multiple images one to another;

"Image Mixing" for blending the multiple images together with the proper weighting;

"Ghost Removal" for removing location shifted replications of scene objects, or ghosts, that would appear in the mixed HDR image, due to the movement of these objects over the time the multiple images were acquired; and "Tone Mapping" for preparing the final HDR image for presentation on a conventional displays that are limited to displaying 8 bit per pixel per color image pixels.

To execute these four processing operations requires the performance of a large number of floating point operations over a short period of time, as can be seen from a review of "High Dynamic Range Imaging Acquisition, Display, and Image-Based Lighting, authors Erik Reinhard, Sumanta Pattanaik, Greg Ward and Paul Debevec, published by Morgan Kaufmann Publishers, copyright 2005 by Elsevier, inc. This is especially the case for the image mixing and ghost removal processing operations. Thus, powerful and expensive computational engines (Central Processing Units or CPUs) need to be used. Their expense can possibly be tolerated for professional digital cameras use, but for inexpensive "Point and Shoot" digital cameras, which incorporate limited processing power CPUs, they represent an impractical solution.

An HDR Image can be created from a bracketed exposed image series captured by an inexpensive digital camera by uploading the image series from the camera to a general purpose computer, such as Personal Computer (PC). An image processing application, such as Adobe Photoshop, can be used to perform the required complex HDR image combining process on a desktop. This approach is not efficient or convenient and does not meet demands to reconstruct an HDR image on the camera's built-in display shortly after its capture.

Thus there exists a need for an in-camera method and apparatus that can rapidly create a HDR image from a bracketed exposed image series, and display it on the camera's built-in display shortly after capture, using a limited processing power CPU.

SUMMARY OF INVENTION

It is therefore desirable to:

(a) effect a mixing operation on a series of two or more images of a scene, such series images having been registered one to another, each image composed of pixels containing digital bits, to generate a composite image in which each pixel contains a number of digital bits, the number being greater than the number of digital bits contained in any series image pixel, in a processing operation resource efficient manner; and (b) effect a ghost removal operation that removes location shifted replications of scene objects appearing in mixed image data, the mixed image data generated by a digital image mixing process applied to scene images acquired at different exposure levels and times, in a processing operation resource efficient manner.

According to a first aspect of the present invention, a registered, captured bracketed exposed image series composed of two or more LDR images is mixed to generate a HDR image with digital pixel bit width values greater than that contained in any of the initial LDR image pixels. Series images at different exposure levels are captured, where a series image exposed at a first exposure level is exposed less than a series image exposed at a second exposure level, which is exposed less than a series image exposed at a third exposure level, which is exposed less than a series image exposed at a $n^{th}$ exposure level. A normalized image exposure level for each image in the series is derived by using the exposure level of the least exposed image of the series as the reference exposure level, and is employed in an image mixing process, wherein series images are blended together, two at a time. The image captured at the lowest exposure level of the series is first blended together with the image captured at the next highest exposure level in the series, to generate a first intermediate image. The generated first intermediate image is then blended together with the image captured at the next highest exposure level of the series to generate a second intermediate image. If the bracketed exposed image series is composed of two images, the mixing process stops at the generation of the first intermediate image, and the generated HDR image output is the first intermediate image. If there are three images in the series, the generated HDR image output is the second intermediate image. If there are more images in the bracketed exposed image series than three, each generated intermediate image is blended with the image captured at the next highest exposure level of the series to generate a next intermediate image, until there are no more series images left to blend. In this case, the HDR image output is the image generated by the blending of the last remaining image in the series with the previously generated intermediate image.

This mixing process operation greatly reduces the processing power required to mix a bracketed exposed image series to generate a HDR image, while minimizing processing latency. The act of normalizing image exposure level for each captured image to the exposure level of the lowest exposed (darkest) image of the bracketed exposed image series allows the mathematical operations employed by the blending processes to be mostly restricted to summations and multiplications, thus avoiding the use of division operations that have high computational resource requirements.

According to a second aspect of the present invention, a two stage computational resource efficient process is used to remove location shifted replications of scene objects, or ghosts, appearing in the mixed HDR image data generated by a digital image mixing process applied to a series of scene images acquired at different exposure levels and times. The second stags process removes ghosts that remain after the execution of the first stage of the ghost removal process. In the first stage the variance of the luma of every pixel of the HDR image as compared to the pixels of a reference image is calculated, pixels in HDR image regions with variances exceeding a first threshold are replaced with pixels from the corresponding image regions of one the image series images, which is used as the reference image. This procedure removes a major part of the ghosts, but some ghosts may still remain. In the second processing stage, the luma of pixels of the ghost reduced HDR image, the first processed HDR image, resulting from the first stage ghost removal processing operation, are compared with the luma of pixels from the corresponding image regions of same image series reference image used for the first ghost removal stage. Ghost residuals are detected by calculating the differences between the luma of the first processed HDR image pixels and the luma of the pixels of the reference image. A second threshold based on the peak of these differences is generated. Pixels in HDR image regions exceeding this second threshold are replaced with pixels from the corresponding image regions of the reference image to produce a second processed HDR image.

In accordance with a third aspect of the present invention, the invention is incorporated within a digital camera that captures a series of two or more digital images of a scene at different exposure levels, and at different times, to generate a tone mapped HDR image, that can be displayed shortly after the images of the series are captured, on the camera's built-in display. Such a digital camera includes the image mixing and ghost removal processing operations of the present invention, with image registration, tone mapping, general digital camera image processing, control, image sensing and display technologies that are well known in the art.

By mixing two images of the series at a time, and removing ghosts from the mixed HDR image with respect to an image of the image series, the mixing and ghost removal processing operations of the present invention can commence prior to the capture of all the images that comprise the image series. In some cases image mixing can commence immediately after the capture of the second image of the series. The low computational resource utilization of the present invention's image mixing and ghost removal processing operations, along with the present invention's ability to commence image mixing and ghost removal prior to the acquisition of all series images, can significantly reduce the time required for a digital camera with low processing power to generate a tone mapped HDR image and display the HDR image on its built-in display.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing, in the drawings.

DESCRIPTION OF THE PREFERRED EMBODIMENT

The present invention will now be described more fully hereinafter with reference to the accompanying drawings, which form a part thereof, and which show, by way of illustration, a specific embodiment by which the invention may be practiced. The invention may, however, be embodied in many different forms and should not be construed as limited to the embodiment set forth herein; rather, this embodiment is provided so that this disclosure will be thorough and complete, and will fully convey the scope of the invention to those skilled in the art. Among other things, the present invention may be embodied as methods or devices. Accordingly, the present invention may take the form of an entirely hardware embodiment in the form of modules or circuits, and entirely software embodiment in the form of software executed on a general purpose microprocessor, an application specific microprocessor processor, a general purpose digital signal processor or an application specific digital signal processor, or an embodiment combining software and hardware aspects. Thus, in the following description, the terms "circuit" and "module" will be used interchangeably to indicate a processing element that executes an operation on a input signal and provides an output signal therefrom regardless of the hardware or software form of its implementation. Likewise, the terms "register", "registration", "align" and "alignment" will be used interchangeably to indicate the process of causing like objects to correspond one to another, and be in correct adjustment, regardless if the mechanism employed to bring about such correspondence is implemented in the form of hardware or software. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or", unless the context clearly dictates otherwise. The term "based on" is not exclusive and allows for being based on additional feelers not described, unless the context clearly dictates otherwise. In addition, throughout the specification, the meaning of "a", "an", "and" and "the" include plural references. The meaning of "in" includes "in" and "on". Also, the use of "including", "comprising", "having", "containing", "involving", and variations thereof herein, is meant to encompass the items listed thereafter and equivalents thereof as well as additional items.

Figure 1:
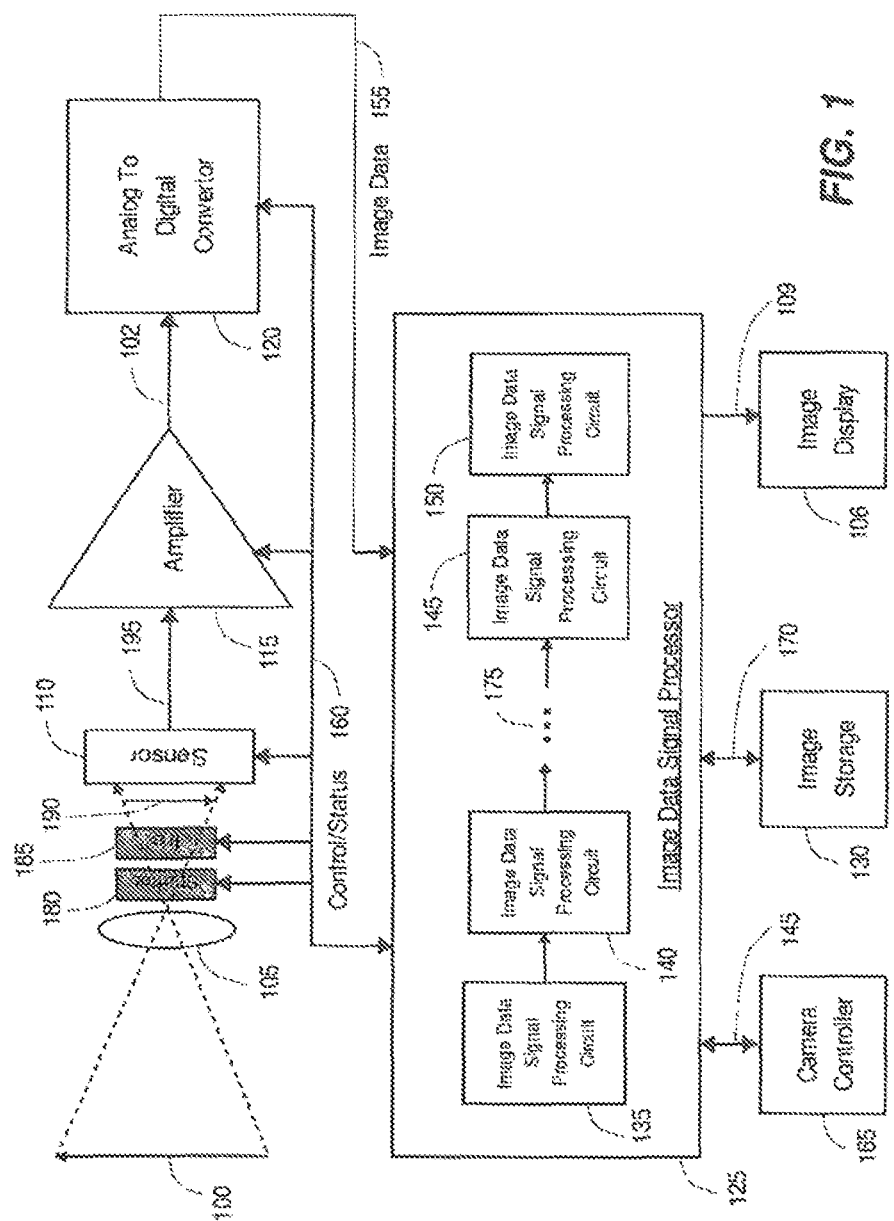
FIG. 1 is a block diagram of a digital camera or other image capture apparatus that captures a plurality of digital images of a scene, at different exposure levels and at different times, and displays these images on the camera's built-in image display.

FIG. 1 shows a digital camera or other image capture apparatus which includes an Imaging Optical System 105, an Electronically Controlled Shutter 180, an Electronically Controlled Lens iris 185, an Optical Image Sensor 110, an Analog Amplifier 115, an Analog to Digital converter 120, an Image Data Signal Processor 125, an Image Data Storage Unit 130, an Image Display 106, and Camera Controller 185. The Image Data Storage unit could be a memory card or an internal nonvolatile memory. Data of images captured by the camera may be stored on the Image Data Storage Unit 130. In this exemplary embodiment, it may also include internal volatile memory for temporary image data storage and intermediate image processing results. This volatile memory can be distributed among the individual image data processing circuits and need not be architecturally located in a single image data storage unit such as Image Data Storage Unit 130. The Optical System 105 can be a single lens, as shown, but will normally be a set of lenses. An Image 190 of a Scene 100 is formed in visible optical radiation onto a two-dimensional surface of an image sensor 110. An electrical output 195 of the sensor carries an analog signal resulting from scanning individual photo-detectors of the surface of the Sensor 110 onto which the Image 190 is projected. Signals proportional to the intensity of light striking the individual photo-detectors are obtained in the output 195. The analog signal 195 is applied through an Amplifier 115 to an Analog to Digital Converter 120 by means of amplifier output 102. Analog to Digital converter 120 generates an image data signal from the analog signal at its input and, through output 155, applies it to Image Data Signal Processor 125. The photo-detectors of the Sensor 110 typically defect the intensity of the light striking each photo detector element in one of two or more individual color components. Early detectors detected only two separate color of the image. Detection of three primary colors, such as red, green and blue (RGB) components, is now common. Currently image sensors that defect more than three color components are becoming available.

Multiple processing operations are performed on the image data signal from Analog to Digital Converter 120 by Image Data Signal Processor 125. Processing of the image data signal, in this embodiment, is shown in FIG. 1 as being effected by multiple image data signal processing circuits within Image Data Signal Processor 125. However, these circuits can be implemented by a single integrated circuit image data signal processor chip that may include a general purpose processor that executes algorithmic operations defined by stored firmware, multiple general purposed processors that execute algorithmic operations defined by stored firmware, or dedicated processing logic circuits as shown. Additionally, these operations may be implemented by several integrated circuit chips connected together, but a single chip is preferred. FIG. 1 depicts the use of image data signal processing circuits 135, 140, 146, and 150 connected in series to effect multiple algorithmic processing operations on the image data signal from Analog to Digital Converter 120. The result of these operations is a stored nonvolatile digital image data that can be viewed either on the digital camera's internal Image Display 106 of FIG. 1, or an external display device. This viewing can be effected either by the physical removal of a memory card from the digital camera and the reinsertion of this card into an external display device, or the electronic communication of the digital camera with an external display device by the use of a Universal Serial Bus (USB) connection, or a Wi-Fi or Bluetooth wireless local area network.

Additional processing circuits as indicated by the dots 175 between circuit 146 and 150, can be included in the digital camera's image data signal processor. The series structure of the image data signal processor of the present embodiment is known as a "pipe line" architecture. This architectural configuration is employed as the exemplary embodiment of the present invention, however other architectures can be used. For example, an image data signal processor with a "parallel architecture", in which one or more image data signal processing circuits are arranged to receive processed image data signals from a plurality of image data signal processing circuits, rather than after they have been processed serially by all preceding image data signal processing circuits, can be employed. A combination of a partial parallel and a partial pipeline architectures is also a possibility.

Figure 2:
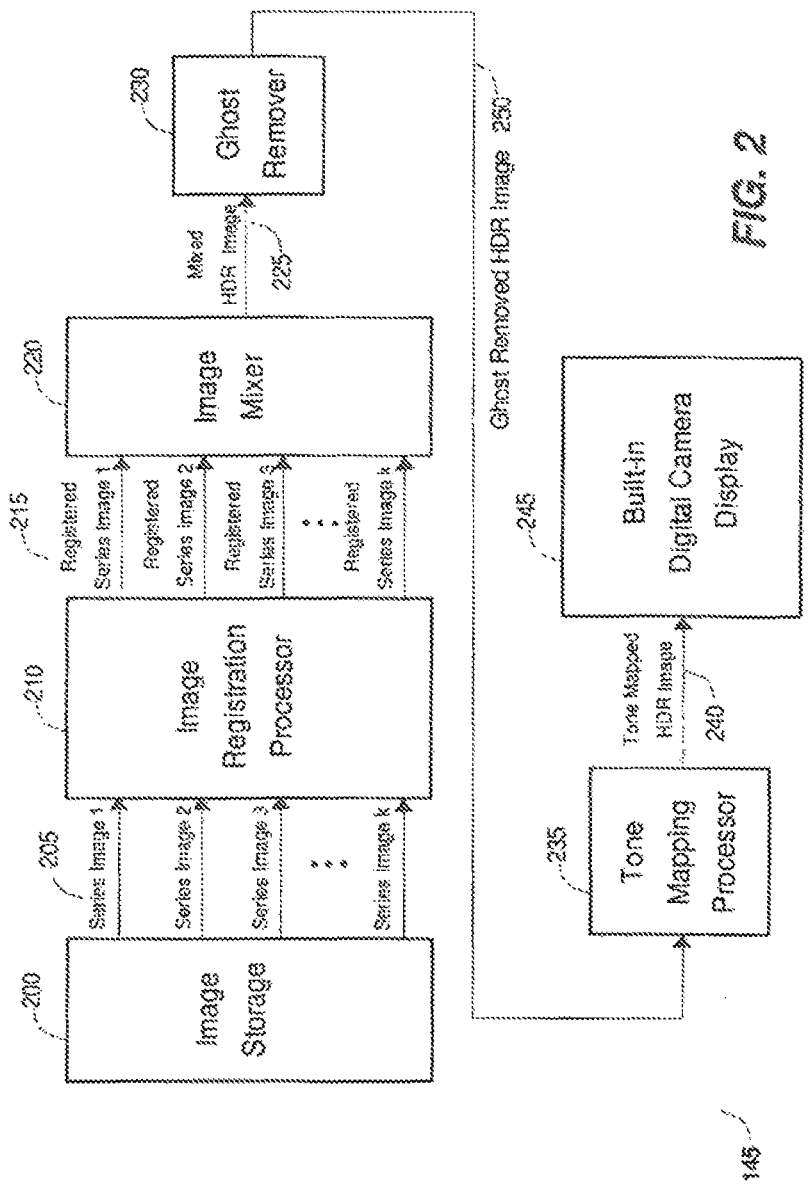
FIG. 2 is a high level block diagram of an embodiment of the present invention illustrating processing modules as implemented in a digital camera.

The series of image data signal processing circuits of Image Data Processor 125 is called an "image processing pipe". The present invention adds image data signal processing circuits shown in FIG. 2 to those routinely included in the image processing pipe of a digital camera. Image data signal processing circuits routinely included in the image processing pipe of a digital camera include circuits for White Balance Correction (WBC), Lens Shading Correction (LSC), Gamma Correction (GC), Color Transformations (CTM), Dynamic Range Compression (DRC), Demosaicing, Noise Reduction (NR), Edge Enhancement (EE), Scaling, and Lens Distortion Correction (LDC). As depicted in FIG. 2, the present invention adds an Image Registration Processor (IRP) circuit 210, an Image Mixer (M) circuit 220, Ghost Remover (GR) circuit 230, and Tone Mapping Processor (TMP) circuit 235 to the complement of image data signal processing circuits discussed above. Image Storage 200 of FIG. 2 stores the digital data of a series of two or more images of a scene, each series image composed of pixels containing digital bits, these digital bits having been processed by image data signal processing circuits in the image processing pipe. Image Storage 200 could share memory with Image Storage 130 of FIG. 1, however, memory resources used for temporary image data storage and intermediate image processing results, or totally separate volatile or nonvolatile memory resources, could provide the memory resources used by Image Storage 200.

Referring to FIG. 1, Camera Controller 165, through line 145 and Control/Status lines 160, causes Electronic Shutter 180, Electronic iris 185, Image Sensor 110, Analog Amplifier 115, and Analog to Digital converter 120 to capture and convert to digital image data a series of images of a scene. These images are captured at different exposure levels, processed by image data signal processing circuits, and stored in Image Storage 200 of FIG. 2. Image Registration Processor 210 reads the image series digital image data stored in Image Storage 200 and registers counterpart pixels of each image of the image series one to to the other. Image registration is executed before image mixing in order to pixel to pixel align all series images. Due to both camera and object movement occurring during image series capture, such alignment is necessary for image mixer 220 of FIG. 2 to be able to properly combine series image pixels and form an image with the captured scene's full range of gray shades. Such an image is often referred to as a "High Dynamic Range" or "HDR" image. In Image Mixer 220, each series image pixel of each captured series image is combined with its pixel counterpart in each captured series image. Thus, an image pixel representing a particular position on the edge or within the body of an object appearing in a first series image is mixed with its counterpart located at the same position on the edge or within the body of the same object appearing in a second series image. In this regard, the location of a pixel in an image is with respect to the object in which it is part of, not to the fixed coordinate system of the defined by the vertical and horizontal outer edges of the image.

Image Registration Processor 210, in general, employs a first image captured at a nominal exposure setting of the camera as a reference image to which all the other images of the series are aligned. A number of techniques are in current use for image alignment and registration. A good example is described in "High Dynamic Range Video", S. B. Kang, M. Uyttendaele, S. Winder, and R. Szeilski, Interactive Visual Media Group, Microsoft Research, Redmond, Wash., 2003. The approach described handles both camera movement and object movement in a scene. For each pixel a motion vector is computed between successive series images. This motion vector is then refined with additional techniques, such as hierarchical homography, to handle degenerate cases. Once the motion of each each pixel is determined, frames can be warped and registered with the chosen reference image. The images can then be mixed by Image Mixer 220 into an HDR image.

The Image Mixing Process

Figure 3:
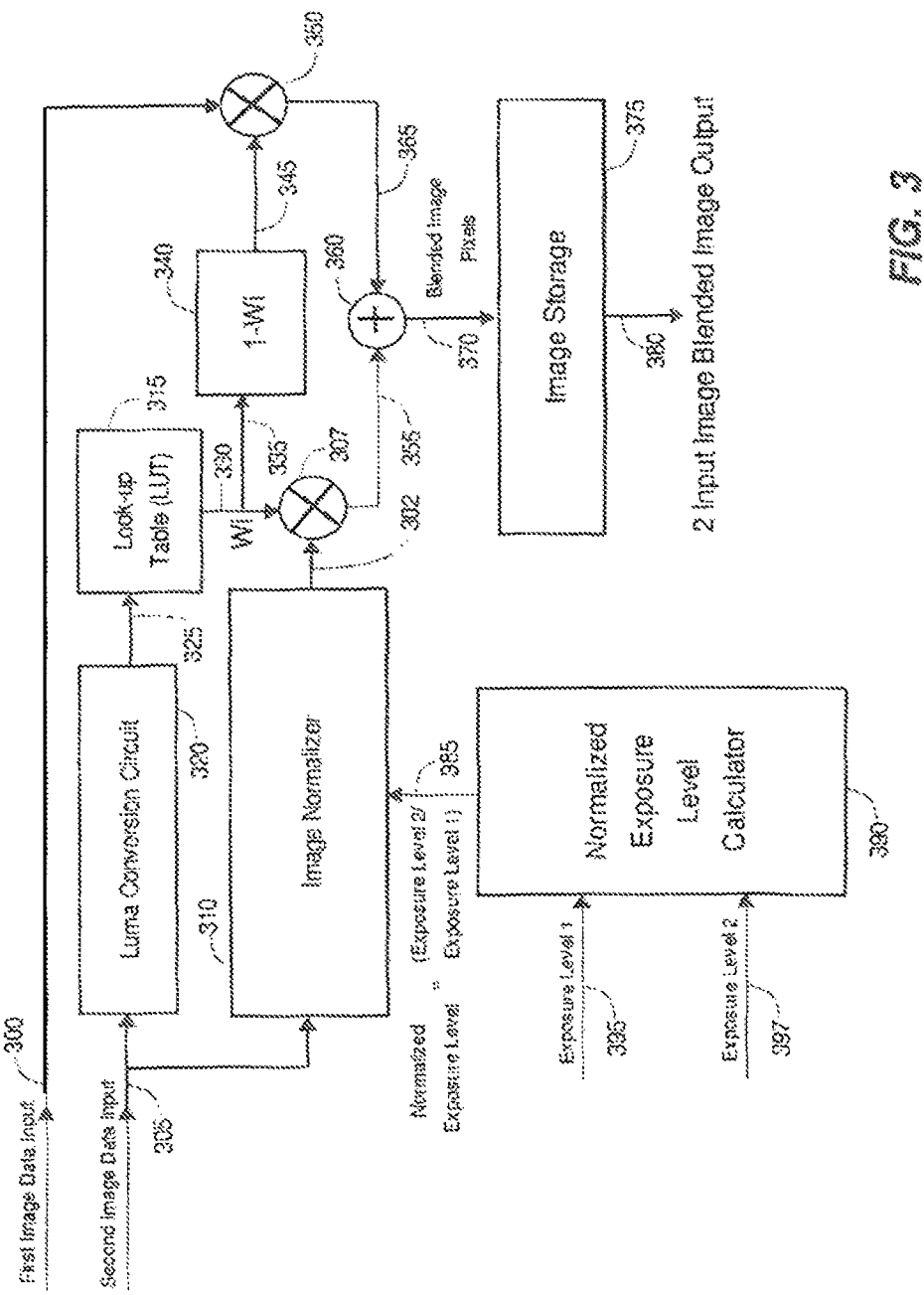
FIG. 3 is a block diagram of an embodiment of the 2 Image Blending Engine of the present invention.
Figure 4:
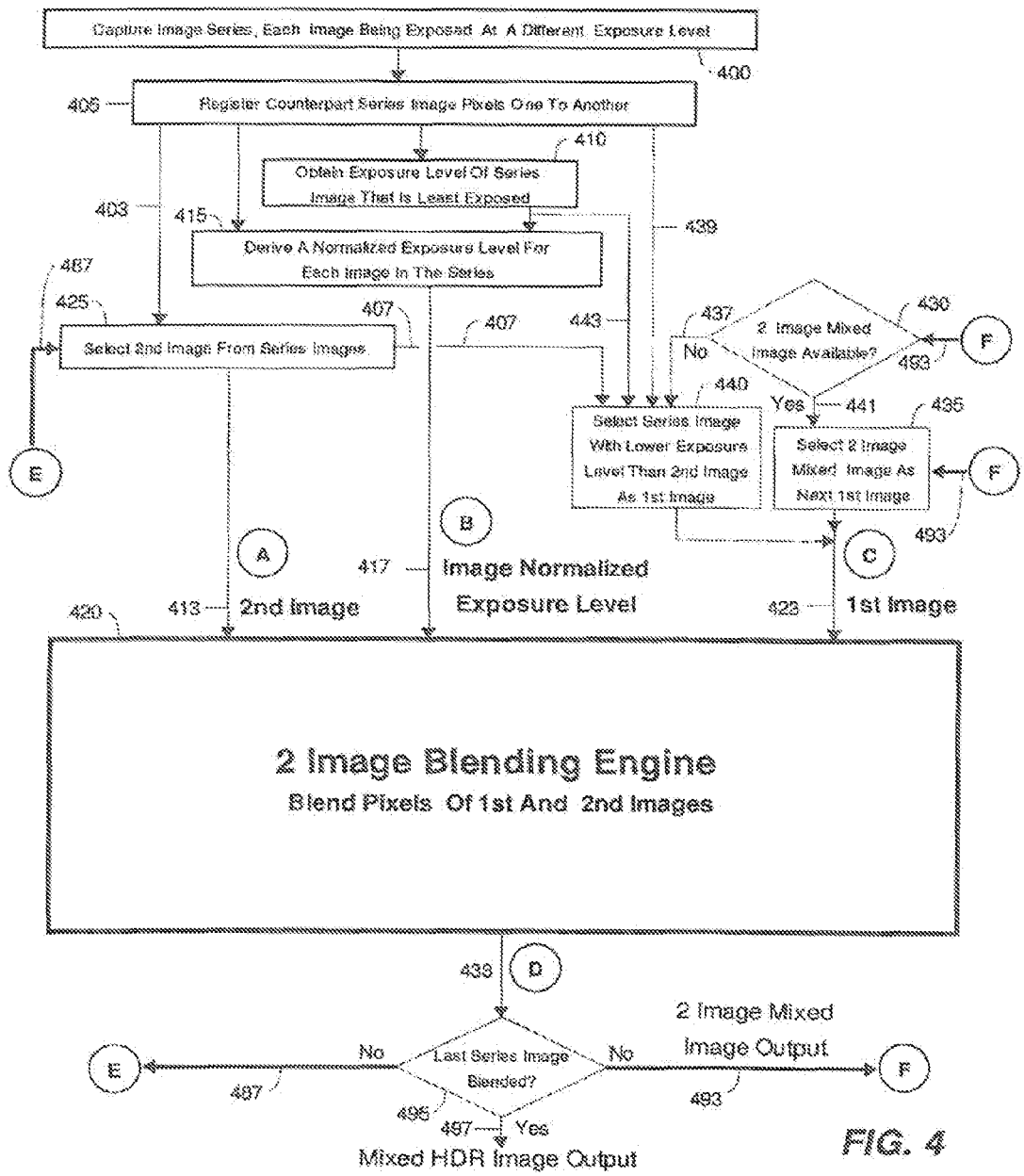
FIG. 4 is a flow chart illustrating the complete image mixing process sequence of an Image Mixer processing method of the present invention.

Image Mixer 220 has the ability to mix an unlimited number of images, but employs an image blending engine that mixes the pixels of 2 images at a lime. The 2 Image Blending Engine of Mixer 220 is shown in FIG. 3. In the preferred embodiment of the present invention, the blending engine blends the pixels of a first 8 bit image whose digital image data appears on input line 300 and the pixels of a second 8 bit image whose digital image data appears on input line 305. Images with bit widths that are wider than 8 bits, for example 10 bits, or narrower, for example 7 bits can be used. The Flow Chart of FIG. 4 illustrates the complete image mixing process of Image Mixer 220, and FIG. 4A details Block 420 of FIG. 4, the process used by the 2 Image Blending Engine of FIG. 3.

Referring to FIG. 3, the image mixing process of the present invention blends 2 images during each image mixing operation. The first 2 images to be blended are both taken from the captured image series, wherein each image of the captured image series has been previously registered with a reference image captured at a nominal exposure setting of the camera. For the initial image mixing operation the series image with a lower exposure level provides the First Image digital image data input appearing on line 300 of FIG. 3, and the series image with a higher exposure level provides the Second Image digital image data input appearing on line 305. For a second and all subsequent image mixing operations, a subsequent image of the series is blended with the result obtained from a previous image mixing operation. For these follow-on mixing operations, the digital image data of a subsequent image of the series serves as the Second Image digital image data input appearing on 305, and the mixed image digital image data result serves as the First Image digital image data input appearing on line 300 of FIG. 3. In all cases, the subsequent image of the series has been exposed at a higher exposure level than its immediate image series predecessor.

The Second Image digital image data on line 305 is initially processed in 2 ways. (1) Luma Conversion Circuit 320 extracts the Luma, the black and white component, of the combined Red, Green and Blue (RGB) component data comprising Second Image digital image data 305, and outputs the Luma component of each image data pixel on line 325. (2) Image Normalizer 310 normalizes the exposure level of each RGB component of the Second Image image data on line 305 to the exposure level of a reference image, and outputs on line 302 each image data pixel, for each color component, normalized to the reference image exposure level. Note that the reference image used is not necessarily the same reference image used for the registration process previously described. For the preferred embodiment of the present invention the exposure level of the darkest image of the series, that is the image which is least exposed, serves as the reference exposure level and all other images of the series are normalized to it. For example, if the captured image series is composed of 3 images, a dark image exposed for $1/64$ sec, a medium image exposure at $1/16$ sec and a bright image exposed at $1/2$ sec, the normalized value of each pixel of the medium image appearing on line 302 would be:

$$\text{Medium Pixel Value}_{Normalized} = \text{Medium Pixel Value}_{Input}/((1/16)/(1/64)) = \text{a Medium Pixel Value}_{input}/4; \quad (1)$$

and the normalized value of each pixel of the bright image appearing on line 302 would be:

$$\text{Bright Pixel Value}_{Normalized} = \text{Bright Pixel Value}_{Input}/((1/2)/(1/64)) = \text{Bright Pixel Value}_{Input}/32 \quad (2)$$

Therefore, for the preferred embodiment of the present invention:

$$\text{Exposure Level}_{Normalized} = \text{Exposure Level}_{Series\ Image}/\text{Exposure Level}_{Least\ Exposed\ Series\ Image} \text{ and;} \quad (3)$$

the normalized value of each pixel of the Second Image Data input on line 305 and output on line 302 is:

$$\text{2nd Image Pixel Value}_{Normalized} = \text{2nd Image Pixel Value}_{Input} / \text{2nd Image Exposure Level}_{Normalized} \quad (4)$$

The luma component of each Second Image digital image data pixel appearing on line 325 of FIG. 3 is input to Look-up Table (LUT) 315 to obtain a per pixel weighting parameter, $W_i$, on lines 330 and 335. The luma component of each Second Image pixel serves as an index into LUT 315, and causes a weighting parameter value, $W_i$ between the numbers zero and Unity to be output to lines 330 and 335 for each input luma value. This value is output in the form of a two dimensional matrix where:

$$W_{(m,n)} = 255 - \text{Luma}_{(m,n)}. \quad (6)$$

$\text{Luma}_{(m,n)}$ is the Luma component of each Second Image digital data pixel at image coordinates (m,n), which, for the preferred embodiment of the present invention, can attain a maximum value of 255, since the embodiment blends the pixels of 8 bit series images, and 255=Unity, which, represents Table 315's 100% output-value, because the luma component Second Image pixel values serving as indexes into LUT 315, are 8-bit digital values with a number range from 0 to 255. Therefore, defining 255 as Unity allows for a direct mapping from input index value to output weighting parameter value and reduces weighting parameter application computational work load. Other values of Unity can be chosen. For example, if the luma component Second Image pixel values serving as indexes info LUT 315 are 10-bit digital values, with a number range from 0 to 1024, it would be appropriate and beneficial to assign Unity the value of 1024.

For the preferred embodiment, the weighting parameter value output from LUT 315 linearly decreases as the luma component Second Image pixel value, serving as the index into LUT 315, increases. Other LUT functions, for example, trapezoidal shaped functions in which the weighting parameter value obtained from LUT 315 remains at a predetermined value and starts to linearly increase when the luma component Second Image pixel value index decreases below a threshold, may be used as well. The choice of LUT 315 functions is based on the observation that when two images are mixed, one which is highly saturated, due to being exposed at a high exposure level, perhaps at a long exposure time, and the other dark, due to being exposed at a lower exposure level, perhaps at a short exposure time, it is desirable to apply a low weight to the highly saturated pixels of the image with the high exposure level, while applying a high weight to the counterpart pixels of image with the low exposure level. This will result in a mixed image with fewer highly saturated pixels, since many have been supplanted by counterpart, properly exposed pixels. The result is a mixed image with greater detail in its highlight areas.

The present invention is not restricted to the use of a single LUT 315. A plurality of LUTs can be used. In this case a different LUT can be associated with each Series Image for obtaining the weighting value, or two or more Series Images can be associated with the same LUT from a plurality of provided LUTs. These LUTs can, for example, be populated with weighting parameter values responsive to Series Image exposure levels.

During the blending operation of the present invention, the weighting parameter is applied, on a pixel by pixel basis, to each color component of the normalized Second Image digital image data appearing on line 302, and 1 minus the weighting parameter $(1-W_i)$ is applied to each color component of the First Image digital image data appearing on line 300. The pixel by pixel blending operation of the present invention is defined by the following equation:

$$\text{Blended Image Data Pixel} = (1-W_i) \times (\text{1st Image Date Pixel}) + W_i \times (\text{Normalized 2nd Image Data Pixel}) \quad (5)$$

The processing blocks of FIG. 3 execute equation (5) as follows: The Luma of the Second Image Data on Line 305 is derived by Luma Conversion circuit 320 and used by LUT 315 to generate weighting parameter $W_i$ on Lines 330 and 335. Multiplier 307 multiplies normalized Second Image Digital Image Data, normalized by Image Normalizer 310, by $W_i$ on Line 330 and outputs the result on Line 355. $W_i$ is also applied to Data Subtractor 340 through Line 335, which outputs $(1-W_i)$ on Line 345. First Image Digital Image Data on Line 300 is multiplied by $(1-W_i)$ on Line 345 by Multiplier 350 and outputs the result on Line 365. The Normalized and weighted Second Image Digital Image Data on Line 355 is added to weighted First Image Digital Image Data on line 365 by adder 380. Adder 360 outputs Blended Image Pixels on Line 370. These pixels are stored in Image Storage 375 and output as 2 Image Blended Image Data on Line 380.

Figure 4A:
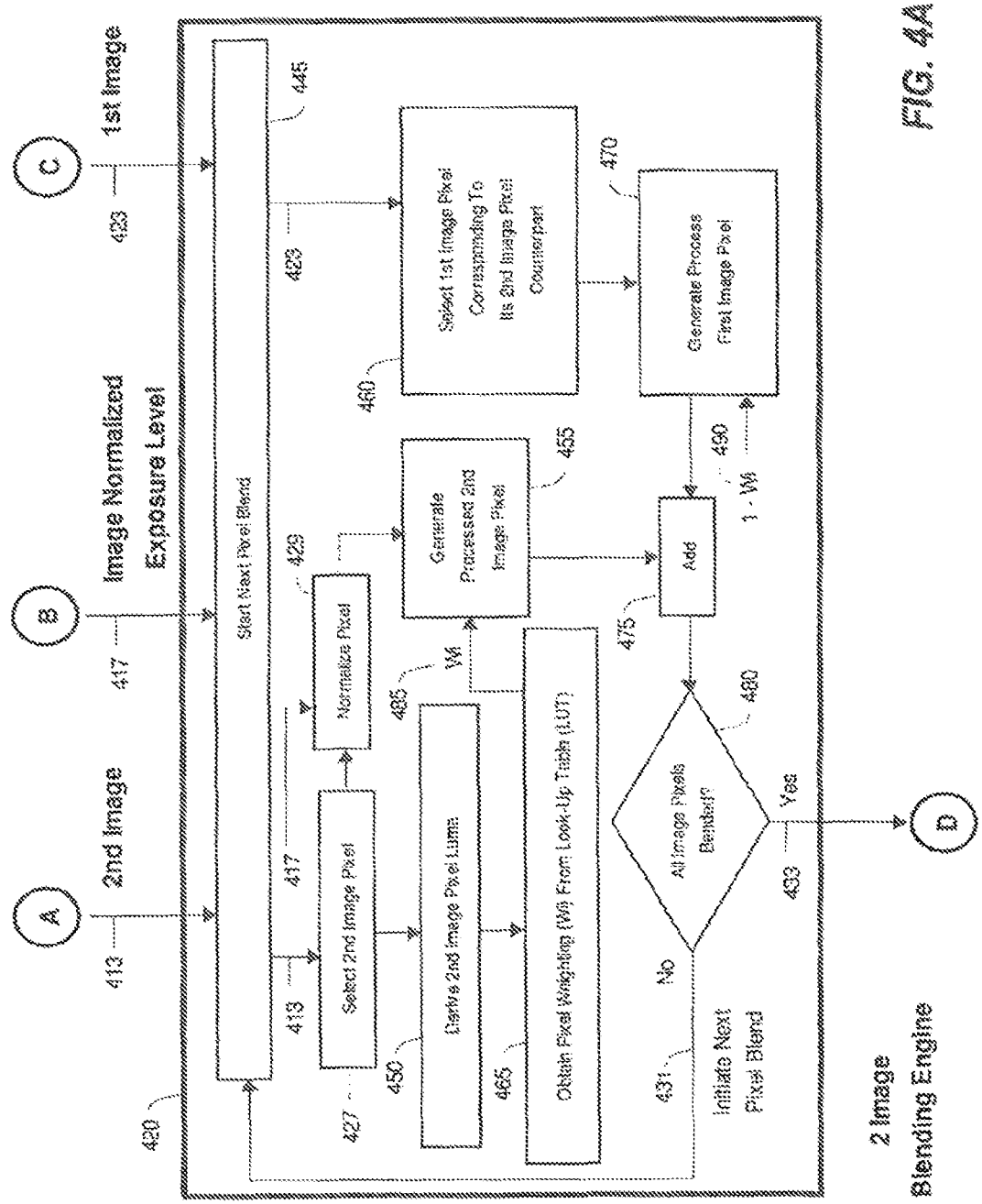
FIG. 4A details the process used by the 2 Image Blending Engine of FIG. 3.

The pixel blending process used by the 2 Image Blending Engine of FIG. 3 is depicted in processing Block 420 of FIG. 4A. The data of the First Image to be blended enters the process at 423 and the data of the Second Image to blended enters the process at 413. The pixel blending process begins at 445. At 427 a pixel from the Second Image is selected. The selected Second Image pixel is normalized at 429 and its luma is derived at 450. The Second Image pixel's luma is used to obtain weighting parameter $W_i$, 486, from a LUT at 465. The normalized Second Image pixel is multiplied by weighting parameter $W_i$, 485, at 455. The normalized and weighted Second Image pixel enters an adding process at 475. The First Image Pixel counterpart of the selected Second Image Pixel is selected at 460 and multiplied by $(1-W_i)$ at 470. The weighted First Image pixel enters the adding process at 475 and is blended with the normalized and weighted Second Image pixel. If there are more image pixels left to blend, as determined at decision point 480 and indicated by "No" on 431, then the next pixel blend cycle is initiated at 445, causing a next First Image pixel and a next Second Image pixel to be selected at 480 and 427, respectively and blended as described.

If there are no more image pixels left to blend, as determined at decision point 480 and Indicated by "Yes" on 433, but there are more images in the captured image series to mix, as determined at decision point 495 and indicated by "No" on 487, then another Second Image is selected from the remaining, unmixed series images, whose data will serve as the next Second Image data to be blended. The Second Image selected will have a higher exposure level than the previous Second Image selection. Such selection is made by Image Selection Process 425 in response to the "No" on 487. Additionally, the 2 Image Mixed Image Output Data at 493 is selected by First Image data selection process 435 as the next First Image data to be blended, due to decision point 430 signaling "Yes" to process 435 at 441, in response to 2 Image Mixed Image data begin available at 493. IF 2 Image Mixed Image data is not available at 483, as would be the case at the beginning of an image mixing process, decision point 430 would signal processing Block 440, by placing a "No" at 437, to select a First Image from the captured image series to be blended with a lower exposure level than the Second Image to be blended selected from the captured image series by processing Block 425. In this case, Selected Second Image exposure level information is communicated to selection Block 440 at 407, least exposed Series Image exposure level information is communicated to selection Block 440 at 443, and selected Series Image data is communicated to processing Block 440 at 439. As depicted in the Flow Chart of FIG. 4, and used in the preferred embodiment of the invention, the Series Image with the least exposure level may be selected as First Image.

If there are no more images in the captured image series to mix, the process concludes with the Mixed HDR Image Output appearing at 497.

The Flow Chart of FIG. 4 illustrates the complete image mixing process of Image Mixer 220. Block 420, depicting the 2 Image Image Blending process used by the 2 Image Blending Engine of FIG. 3, is highlighted in FIG. 4 and illustrated in detail in FIG. 4A. FIG. 4 also includes the processing that precede 2 Image Blending processing Block 420. This processing is comprised of the capture of a series of images, each image being exposed at a different exposure level, at processing Block 400, the registration of counterpart series image pixels one to another, at processing Block 405, the determination of the series image that is least exposed, at Processing Block 410, and the calculation of a normalized exposure level according to Equation (3) previously described, referenced to the least exposed image of the series, for each image in the series, at processing Block 415. This calculated normalized exposure level is used by 429 of processing Block 420 to normalize each Second Image pixel, as previously described by Equation (4), before being multiplied by a weighting parameter and blended with a weighted First Image pixel according to Equation (5) previously described.

The image mixing process of Image Mixer 220 uses only summation and multiplications, thereby avoiding computationally intensive division operations, and allowing it to be implemented by a fixed point computational engine. In addition, since the mixing approach employed is based on successive 2 image mixing operations, there is no need to wait until all series images have been captured before initiating a mixing operation. The mixing process can begin immediately after just 2 images of the series have been captured. These characteristics allow the mixing process of the present invention to rapidly create a HDR image from a bracketed exposed image series using a limited processing power computational engine.

The Ghost Removal Process

Ghost Remover 230 removes location shifted, replications of scene objects, or ghosts, that appear in the Mixed HDR Image Output data at 497 of FIG. 4, due to the movement of these objects over the time the images of the series are captured. Fundamentally, ghosts appear due to the mixing of Series Images in which an object visualized in a First Series Image has moved with respect to its First Series Image location coordinates, as visualized in a Second Series Image. Consequently, in the mixed image, the object may appear in multiple locations with the locations depending on the object's motion rate and motion direction. The present invention employs a unique 2 stage approach to mitigating ghost images.

Given a mixed image, HDR (i,j), generated from a weighted sum of images from a captured aligned image series of K images, the present invention, in a first stage of processing, first calculates the variance of the luma value of every pixel of HDR(i,j) as follows:

$$V(i,j) = \Sigma_k W(i,j,k) \times P^2(i,j,k) - HDR(i,j)^2 \quad (7)$$

Where;
V(i,J)=The variance of the luma value of Mixed HDR image pixel, HDR(i,j), located at image coordinates (i,j) with respect to the value of Kth Series Image pixel located at image coordinates (i,j), over the K aligned images of the captured image series;
HDR(i,j)=The luma value of the Mixed HDR image pixel located at image coordinates (i,j);
W(i,j,k)=A normalizing weight applied to the level of the Kth Series Image pixel located at image coordinates (i,j) to normalize the Series Image pixel level range to the pixel level range of the Mixed HDR image; and
P(i,j,k)=The value of Kth Series Image pixel located at image coordinates (i,j);

and then replaces a Mixed HDR Image pixel whose luma variance exceeds a first threshold level with its counterpart pixel from an aligned reference image, $HDR_{ref}$, the reference image begin chosen from the captured image series, to generate first processed mixed image data, $HDR_{1st\ processed}$.

The first stage of ghost removing processing, described above, is based on the observation that if no local motion exists in the Series Images mixed, the variance of a pixel in the Mixed HDR Image output over the K aligned images of the captured image series, as defined by Equation (7) above, will be low. The only significant error associated with this assumption is alignment error, which is around −15 decibels relative to the variance of each of the K aligned images of the captured image series. Since alignment is inherently a global process, it cannot compensate for local image object local motion, and thus local object motion is manifested as high amplitude pixel variance regions. By analyzing the high amplitude pixel variance regions in the 2-dimensional variance data generated by Equation (7), regions of local motion in the Mixed HDR Image output data can be defined, and Mixed HDR Image output data pixels with variances above a predefined threshold can be replaced with counterpart pixels from the reference image. The reference image chosen is often the least exposed Series Image, but may be a Series Image exposed at a higher exposure level.

The present invention's first stage of ghost removal processing generates first processed mixed image data, $HDR_{1st\ processed}$, with less ghosting. However some residual ghosting still remains. A second stage of processing improves these results by comparing the content of $HDR_{1st\ processes}$ with $HDR_{ref}$. In this second stage, ghost residuals are detected by analyzing the pixel to pixel result obtained by subtracting the luma of $HDR_{ref}$ from the luma of $HDR_{1st\ processed}$. A second threshold level based on the maximum value of the differences between the luma of $HDR_{1st\ processed}$ and the luma of $HDR_{ref}$ is generated. Each $HDR_{1st\ processed}$ data pixel exceeding the second threshold level is replaced with its counterpart. $HDR_{ref}$ data pixel, resulting in second processed mixed image data, $HDR_{2nd\ processed}$, with fewer ghosts. The procedure used by the preferred embodiment of the present invention's second stage of processing can be summarized as follows:

(a) Generate $D_0$ = ABS(Luma($HDR_{1st\ processed}$) − Luma($HDR_{ref}$));
(b) Determine $Threshold_{2nd}$ = Max($D_0$) = $D_{M0}$.
(c) Replace each $HDR_{1st\ processed}$ data pixel exceeding $Threshold_{2nd}$ with its counterpart $HDR_{ref}$ data pixel, resulting in $HDR_{2nd\ processed}$ mixed image data
(d) Compare $HDR_{2nd\ processed}$ with $HDR_{ref}$ and generate Max($D_1$) = $D_{m1}$ where $D_{m1}$ = Max((ABS(Luma($HDR_{2nd\ processed}$) − Luma($HDR_{ref}$)))

-continued

| | |
|---|---|
| (d) | If $D_{m1} > 60\%$ of $D_{M0}$, $Threshold_{2nd}$ is too large and $HDR_{2nd\,processed}$ may look too much like $HDR_{ref}$. Then: |
| (e) | Segment $D_{M0}$ into 2 levels, where $D_{M00} =$ a value $< 0.5D_{M0}$, and $D_{M01} =$ a value $> 0.5D_{M0}$ |
| (f) | Determine, in percent, the amount of $HDR_{2nd\,processed}$ image area relative to the full image area, exceeding $D_{M01}$, SIZE__1 |
| (g) | Determine, in percent, the amount of $HDR_{1st\,processed}$ image area relative to the full image area, exceeding $D_{M00}$, SIZE__0, where SIZE__1 should be $>=$ SIZE__0. |
| (g) | Calculated SIZE-RATIO = SIZE__1 / SIZE__0 |
| (h) | IF (SIZE__0 > 40% || (SIZE__RATIO > 2 && SIZE__1 > 8 %)) |
| (i) | Capture Series Images again |
| (j) | Else |
| (k) | Replace pixels of $HDR_{2nd\,processed}$ image areas exceeding $D_{M01}$, with their counterpart $HDR_{ref}$ pixels, resulting in $HDR_{2nd\,processed}$ mixed image data |
| (10) | End |

The ghost removal process of the present invention can be applied to any aligned, captured bracketed exposed series of two or more images. In addition, two or more $HDR_{ref}$ Images can be employed by the process. When the process is applied to a series of three images, for example, the exposure level of a first series image being lower than the exposure level of a second series image and the exposure level of the second series image being lower than the exposure level of a third series image, the areas of the regions of the second series image that correspond to mixed image data with variances that exceed the first threshold can be used to select between 2 reference images, $HDR_{ref1}$ and $HDR_{ref2}$. In this example, second series image region areas that are saturated are summed and a ratio of the sum of saturated area to the total area of the second series image is used to select $HDR_{ref}$ for the remainder of ghost removal processing. If the ratio is less than or equal to 0.03 to 1 then $HDR_{ref2}$=the second series image is selected. If the ratio is greater than 0.03 to 1 then then $HDR_{ref1}$=the first series image is selected. Further, the above selection approach, or ones similar in nature that are responsive to other image characteristics, such as, for example, the size of image areas with object movement above a predetermined threshold, or spacial frequency details above a predetermined threshold, can be used to select a $HDR_{ref1}$ for the first stage of ghost removal processing and, additionally a different $HDR_{ref2}$ for the second stage of ghost removal processing.

Figure 5:
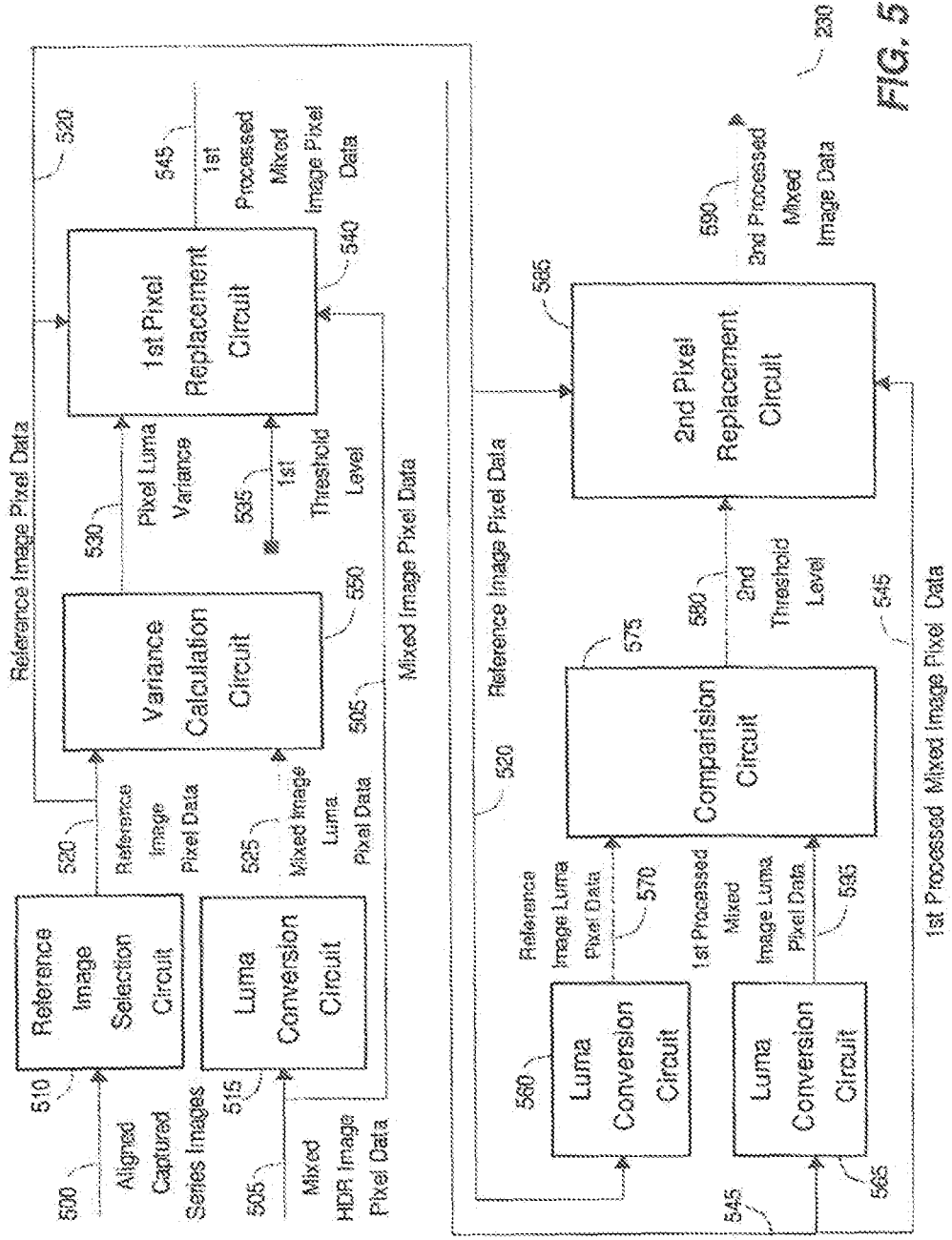
FIG. 5 is a block diagram of an embodiment of the Ghost Remover processing module of the present invention.

FIG. 5 is a block diagram of an embodiment of the present invention's Ghost Remover processing module, 230 of FIG. 2. Mixed HDR Image pixel data is input to Luma Conversion Circuit 515 and First Pixel Replacement Circuit 540 on line 505 of FIG. 5. Luma Conversion Circuit 515 converts Mixed HDR Image Pixel Data to Mixed Image Luma Pixel Data and, through line 525, inputs Mixed Image Luma Pixel Data to Variance Calculation Circuit 550. Although not shown in FIG. 2, aligned images of the captured bracketed exposed series of two or more images are input to the Ghost Remover module 230 on line 500 of FIG. 5, which is connected to Reference Image Selection Circuit 510. In the preferred embodiment of the present invention, Reference Image Selection Circuit 510 selects the least exposed series image as the reference image, $HDR_{ref}$, however a Series Image exposed at a higher exposure level could be selected. Through line 520, $HDR_{ref}$ Pixel Data is also applied to Variance Calculation Circuit 550. Additionally, line 520 applies $HDR_{ref}$ Pixel Data to 1st Pixel Replacement Circuit 540, 2nd Pixel Replacement Circuit 585 and Luma Conversion Circuit 560. From the $HDR_{ref}$ Pixel Data on line 520 and Mixed Image Luma Pixel Data on line 525, Variance Calculation Circuit 550 generates output Mixed Image Luma Pixel Variance Data on line 530. This Luma Pixel Variance Data is applied to First Pixel Replacement Circuit 540 through line 530. On line 535, a 1st Threshold Level is also applied to 1st Pixel Replacement Circuit 540. From these inputs, 1st Pixel Replacement Circuit 540 replaces pixels of the Mixed Image Pixel Data on line 505, whose Luma variance exceeds the first threshold level on line 538, with counterpart pixels from the $HDR_{ref}$ Data on line 520, to generate first processed mixed image pixel data, $HDR_{1st\,processed}$, on line 545, which is the output of a first stage of processing.

The first stage of processing output, $HDR_{1st\,processed}$, on line 545, is converted to $HDR_{1st\,processed\,Luma}$ Pixel Data by Luma Conversion Circuit 585. The output of Circuit 565 appears on line 595 and is connected to Comparison Circuit 575. $HDR_{1st\,processed}$ on line 545 is also applied to 2nd Pixel Replacement Circuit 585. Line 520 applies $HDR_{ref}$ Pixel Data to Luma Conversion Circuit 500 and 2nd Pixel Replacement Circuit 585. Pixel Data to Luma Conversion Circuit 560 converts $HDR_{ref}$ Pixel Data to $HDR_{ref\,Luma}$ Pixel Data, and provides the $HDR_{ref\,Luma}$ Pixel Data to Comparison Circuit 575 over Line 570. Comparison Circuit 575 calculates the difference between the each $HDR_{1st\,process\,Luma}$ Data Pixel and its counterpart $HDR_{ref\,Luma}$ Data Pixel and generates a 2nd Threshold Level based on the maximum value of the differences. This 2nd Threshold Level is applied to 2nd Pixel Replacement Circuit 585 over Line 580. 2nd Pixel Replacement Circuit 585 replaces each $HDR_{1st\,processed}$ data pixel on line 545 exceeding the 2nd threshold level with its counterpart $HDR_{ref}$ data pixel on line 520, the resulting 2nd processed mixed image data, $HDR_{2nd\,processed}$, on line 590, being the ghost reduced output of a second stage of processing.

Figure 6:
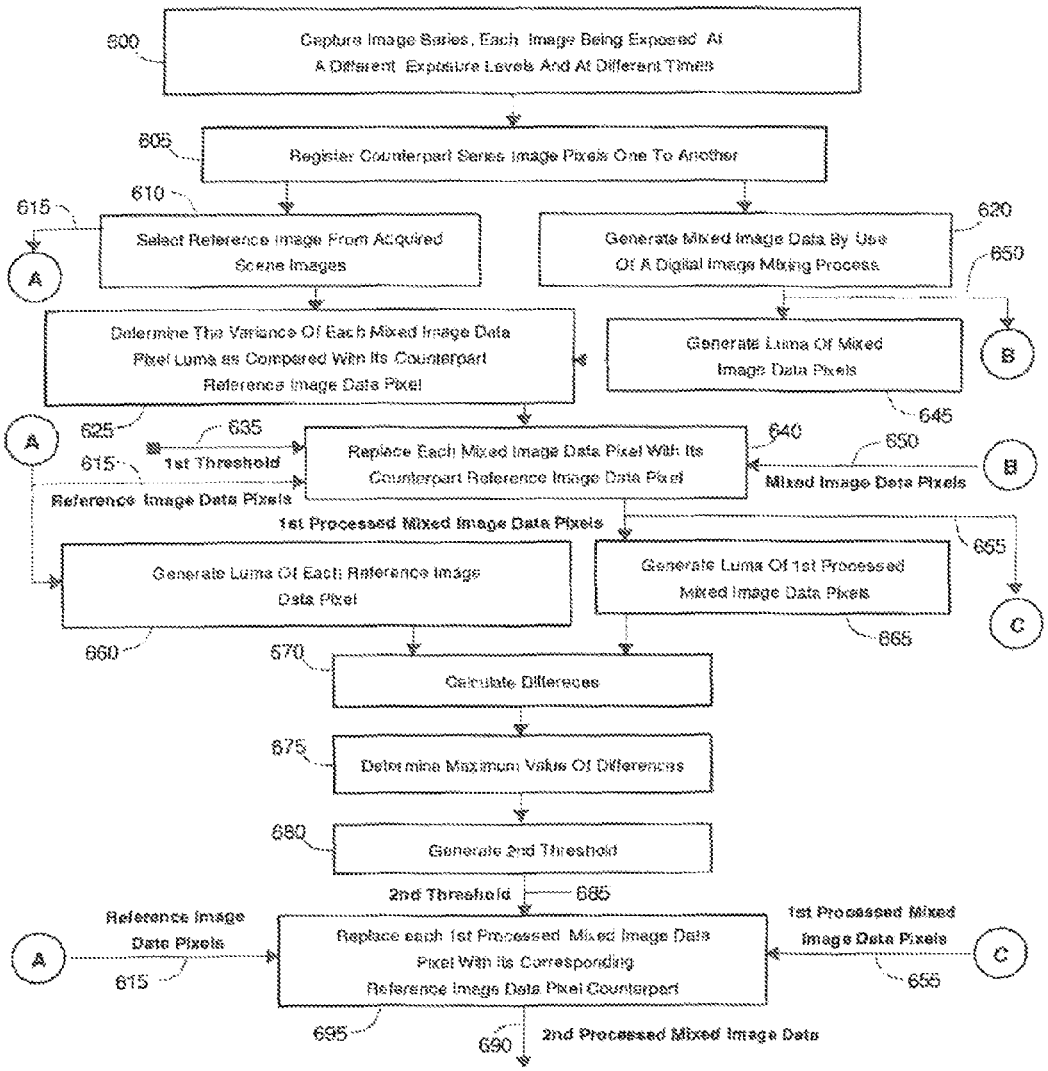
FIG. 6 is a flow chart illustrating the processing sequence of a Ghost Remover processing method of the present invention.

The 2 stage ghost removal process used by the Ghost Remover processing module of FIG. 5 is depicted in the flowchart of FIG. 6. At Block 600, a bracketed exposed series of two or more images, each image exposed at a different exposure level and at a different time, is captured. At Block 605 these images are registered to each other such that counterpart series image pixels correspond one another. At Block 610 a reference image is selected from the acquired scene images and its pixel data is passed onto processing Blocks 625, 640, 660 and 695 over processing path 615. The reference image chosen is often the least exposed Series Image, but may be a Series Image exposed at a higher exposure level. It does not have to be the same reference image as used by the present invention's Image Registration Processor 210, which, in general, employs a first image captured at a nominal exposure setting of the camera as a reference image to which all the other images of the series are aligned. The Image Mixer of the present invention previously described, whose image mixing process is depicted in the flow chart of FIG. 4, performs the processing at Block 620, with the Mixed HDR Image Output Image Data Pixels of FIG. 4 entering processing Blocks 650 and 640. At Block 650 the Luma of Mixed Data Pixels is generated and passed onto Block 625, where the variance of each Mixed Image Data Pixel Luma from Block 650, as compared with its counterpart Reference Image Data Pixel from Block 610, is calculated. This variance is passed to processing Block 640 and used by Block 640, along with a 1st Threshold which enters processing Block 640 along path 635, Mixed Image Data Pixels from processing Block 620, which enters processing Block 640 along path 650, and Reference Image Data Pixels which enters processing Block 640 along path 615, to replace each Mixed Image Data Pixel, with a variance exceeding the 1st Threshold, with its counterpart Reference Image Data Pixel, and generate 1st Processed Mixed Image Data Pixels. 1st Processed Mixed Image Data Pixels are the result of a first stage of ghost removal processing.

1st Processed Mixed Image Data Pixels are passed to processing Blocks 685 and 695 along processing path 655. Processing Block 665 generates the Luma of 1st Processed Mixed Image Data Pixels, while processing Block 660, from Reference Image Data Pixels which enters processing Block 660 over path 615, generates the Luma of each Reference Image Data Pixel. Processing Block 670 calculates the difference, on a pixel by pixel basis, between the Luma value of each 1st Processed Mixed Image Data Pixel and the Luma value of it's counterpart Reference Image Data Pixel and provides these differences to processing Block 675. Processing Block 675 determines the maximum value of these differences and processing Block 680 generates a 2nd Threshold based on this maximum value. Processing Block 695 receives this 2nd Threshold over path 685, along with Reference Image Data Pixels ever Path 615 and 1st Processed Mixed Image Data Pixels over path 655 and replaces each 1st Processed Mixed Image Data Pixel that exceeds this 2nd Threshold with its corresponding Reference Image Data Pixel counterpart, and thus generates enhanced ghost removed 2nd Processed Mixed Image Data on processing Path 695. This 2nd Processed Mixed Image Data, the result of a 2nd stage of ghost removal processing, is used as input to a Tone Mapping processor, such as 235 of FIG. 2.

The Tone Mapping Process

In the preferred embodiment of the present invention, enhanced ghost removed 2nd Processed Mixed Image Data on processing Path 695 of FIG. 6 is 16 bits in bit-width and is comprised of 3 color components, a red component, a green component and blue component. This RGB 16 bit data is to be displayed on Built-In Digital Camera Display 245 of FIG. 2, which is an 8 bit display so the 2nd Processed Mixed Image Data needs to be converted from 16 bit RGB data to 8 bit RGB data. The process of converting image data of one bit-width to that of a narrower bit width, such as from 16 bits to 8 bits, while maintaining the relative gray shade levels represented in the wider bit-width data in the resulting 8 bit data, is referred to as "Tone Mapping". There are many such Tone Mapping processes that can be used by the present invention. The preferred embodiment of the present invention employs a unique tone mapping approach which was originally designed to map 12 bit wide image data to 8 bit wide image data. Therefore, the present invention approach first removes the 4 least significant bits of the 2nd Processed Mixed Image Data, leaving 12 bit RGB image data. Three Look-Up fables (LUTs) are used to map the remaining 12 bit RGB data to the needed 8 bit RGB data:
(a) A Normal Gain LUT,
(b) A High Gain LUT; and
(c) A Very High Gain LUT The proper LUT to use in the 12 bit to 8 bit tone mapping process needs to be selected in order to correctly represent the image gray shades present in the 2nd Processed Mixed Image Data in 8 bit data form. The selection criteria depends on the size of image area populated with pixels whose value, on average, is below a predefined pixel value, or "dark", as compared to the rest of the image area. The lower the average pixel value in the image dark area, the higher the gain of the LUT selected.

The process of LUT selection is as follows:
(1) Shift right the 12 bit RGB image by 4 bits. This results in an 8 bit image;
(2) Generate the Luma component of the resulting 8 bit image;
(3) Calculate the average value, Mn, of all pixels in the 8-bit image whose Luma is less than a threshold for dark area, Td, A digital value of 20 out of a maximum digital value of 255 (the maximum 8 bit value) can be used for Td;
(4) if the sum of all the pixels having Luma<Td is less than an area threshold, P %, use the Normal Gain LUT, Otherwise:
(5) Given Mn and predefined Thresholds pixel value thresholds T1 less than T2:
(6) if Mn≤T1 use the Very High Gain LUT;
(7) If Mn between T1 and T2 use the High Gain LUT
(8) If Mn>T2 use the Normal Gain LUT
Td=20 out of 255, T1=5 out of 255 and T2=10 out of 255 are examples of the Thresholds that can be employed in the above Tone Mapping LUT selection process.

The tone mapping procedure employed by the present invention is designed to boost image regions of low illumination, while the 3 LUTs behave the same for image regions of high illumination. It was found that this provides a good result when applied to the 2nd Processed Mixed Image Data of the present invention.

Having thus described several aspects of the preferred embodiment of the present invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for generating a high dynamic range (HDR) image of a scene based on a series of images of a scene, comprising:
ordering the series of images based at least on a different exposure level for each image;
selecting an image from among the series of images having an exposure level with a lowest value of the different exposure levels as a reference image;
blending together a first image of the ordered series and a second image of the ordered series to generate an intermediate image, wherein the second image of the ordered series is captured at a higher exposure level than the first image of the ordered series, and wherein the second image is normalized to the exposure level of the reference image;
iteratively blending together the generated intermediate image with a next unblended image of the series if the series is composed of more than two images, wherein each blended intermediate image is successively blended with another next unblended image of the series that is exposed at a next higher exposure level than a previously unblended image of the series, until each image of the series is blended together in a last blended intermediate image, wherein the other next unblended image is normalized to the exposure level of the reference image; and displaying a last generated intermediate image as the HDR image of the scene.

2. The method of claim 1, further comprising:

capturing the series of images at different exposure levels;

registering counterpart pixels for each image of the series to each other; and deriving a normalized image exposure level for each image in the series by using the exposure level of the image in the series that is least exposed as a reference level.

3. The method of claim 1, wherein blending further comprises:

deriving a luma value for each pixel in the second image;

using the luma value of a second image pixel as an index into a look-up table (LUT) to obtain a weighting value between the numbers zero and unity;

using the weighting value, the normalized exposure level of the second image, and the second image pixel to generate a processed second image pixel;

selecting a first image pixel that corresponds to the second image pixel;

using the first image pixel and the result of subtracting the weighting value from unity, to generate a processed first image pixel;

adding the processed first image pixel to the processed second image pixel to generate a blended image pixel; and iterating the blending until each pixel of the second image is blended with its corresponding pixel of the first image.

4. The method of claim 3, wherein the obtained weighting value decreases as the luma value used as the index into the LUT increases.

5. The method of claim 3, wherein a different LUT is used for each image for obtaining the weighting value.

6. The method of claim 1, further comprising removing a location shifted replication of an object in the scene that appears in the generated intermediate image.

7. A digital camera operative to capture a series of images of a scene, comprising:

an image capture device configured to capture the series of image of the scene;

a memory configured to store instructions; and a processor configured to execute the instructions that, when executed, cause the processor to perform a process, comprising:

ordering the series of images based at least on a different exposure level for each image;

selecting an image from among the series of images having an exposure level with a lowest value of the different exposure levels as a reference image;

blending together a first image of the ordered series and a second image of the ordered series to generate an intermediate image, wherein the second image of the ordered series is captured at a higher exposure level than the first image of the ordered series, and wherein the second image is normalized to the exposure level of the reference image;

iteratively blending together the generated intermediate image with a next unblended image of the series if the series is composed of more than two images, wherein each blended intermediate image is successively blended with another next unblended image of the series that is exposed at a next higher exposure level than a previously unblended image of the series, until each image of the series is blended together in a last blended intermediate image, wherein the other next unblended image is normalized to the exposure level of the reference image; and enabling a display of a last generated intermediate image as a high dynamic range (HDR) image of the scene.

8. The digital camera of claim 7, further comprising instructions that, when executed, cause the processor to perform a process, comprising:

capturing the series of images at different exposure levels;

registering counterpart pixels for each image of the series to each other; and deriving a normalized image exposure level for each image in the series by using the exposure level of the image in the series that is least exposed as a reference level.

9. The digital camera of claim 7, wherein blending further comprises:

deriving a luma value for each pixel in the second image;

using the luma value of a second image pixel as an index into a look-up table (LUT) to obtain a weighting value between the numbers zero and unity;

using the weighting value, the normalized exposure level of the second image, and the second image pixel to generate a processed second image pixel;

selecting a first image pixel that corresponds to the second image pixel;

using the first image pixel and the result of subtracting the weighting value from unity, to generate a processed first image pixel;

adding the processed first image pixel to the processed second image pixel to generate a blended image pixel; and iterating the blending until each pixel of the second image is blended with its corresponding pixel of the first image.

10. The digital camera of claim 9, wherein the obtained weighting value decreases as the luma value used as the index into the LUT increases.

11. The digital camera of claim 9, wherein a different LUT is used for each image for obtaining the weighting value.

12. The digital camera of claim 7, further comprising instructions that, when executed, cause the processor to perform a process, comprising removing a location shifted replication of an object in the scene that appears in the generated intermediate image.

13. A firmware stored on memory and including instructions for generating a high dynamic range (HDR) image of a scene based on a series of images of a scene, wherein the execution of the instructions causes a processor to:

order the series of images based at least on a different exposure level for each image;

select an image from among the series of images having an exposure level with a lowest value of the different exposure levels as a reference image;

blend together a first image of the ordered series and a second image of the ordered series to generate an intermediate image, wherein the second image of the ordered series is captured at a higher exposure level than the first image of the ordered series, and wherein the second image is normalized to the exposure level of the reference image;

iteratively blend together the generated intermediate image with a next unblended image of the series if the series is composed of more than two images, wherein each blended intermediate image is successively blended with another next unblended image of the series that is exposed at a next higher exposure level than a previously unblended image of the series, until each image of the series is blended together in a last blended intermediate image wherein the other next unblended image is normalized to the exposure level of the reference image; and
display a last generated intermediate image as the HDR image of the scene.

14. The firmware of claim 13, further comprising instructions that, when executed, cause the processor to:
capture the series of images at different exposure levels;
register counterpart pixels for each image of the series to each other; and
derive a normalized image exposure level for each image in the series by using the exposure level of the image in the series that is least exposed as a reference level.

15. The firmware of claim 13, wherein blending further comprises instructions that, when executed, cause the processor to:
derive a luma value for each pixel in the second image;
use the luma value of a second image pixel as an index into a look-up table (LUT) to obtain a weighting value between the numbers zero and unity;
use the weighting value, the normalized exposure level of the second image, and the second image pixel to generate a processed second image pixel;
select a first image pixel that corresponds to the second image pixel;
use the first image pixel and the result of subtracting the weighting value from unity, to generate a processed first image pixel;
add the processed first image pixel to the processed second image pixel to generate a blended image pixel; and
iterate the blending until each pixel of the second image is blended with its corresponding pixel of the first image.

16. The firmware of claim 15, wherein the obtained weighting value decreases as the luma value used as the index into the LUT increases.

17. The firmware of claim 15, wherein a different LUT is used for each image for obtaining the weighting value.

18. The firmware of claim 13, further comprising instructions that, when executed, cause the processor to remove a location shifted replication of an object in the scene that appears in the generated intermediate image.

* * * * *